(12) United States Patent
Joshi

(10) Patent No.: US 10,258,902 B2
(45) Date of Patent: Apr. 16, 2019

(54) MATERIALS AND METHODS FOR MITIGATING HALIDE SPECIES IN PROCESS STREAMS

(71) Applicant: CRYSTAPHASE PRODUCTS, INC., Houston, TX (US)

(72) Inventor: Umakant Pravinchandra Joshi, Houston, TX (US)

(73) Assignee: Crystaphase Products, Inc., Houston, TX (US)

( * ) Notice: Subject to any disclaimer, the term of this patent is extended or adjusted under 35 U.S.C. 154(b) by 0 days.

(21) Appl. No.: 15/485,943

(22) Filed: Apr. 12, 2017

(65) Prior Publication Data

US 2018/0050281 A1    Feb. 22, 2018

Related U.S. Application Data

(60) Provisional application No. 62/378,059, filed on Aug. 22, 2016, provisional application No. 62/377,294, filed on Aug. 19, 2016.

(51) Int. Cl.
*B01D 15/08* (2006.01)
*B01J 20/04* (2006.01)
(Continued)

(52) U.S. Cl.
CPC ............. *B01D 15/08* (2013.01); *B01D 15/36* (2013.01); *B01J 20/048* (2013.01); *B01J 20/06* (2013.01);
(Continued)

(58) Field of Classification Search
CPC ...... B01D 15/08; B01D 15/26; B01D 15/265; B01D 15/365; B01D 15/366;
(Continued)

(56) References Cited

U.S. PATENT DOCUMENTS 5,118,655 A    6/1992 Pedersen
5,124,302 A *   6/1992 Lachman .............. C04B 35/111
                                                            502/208
(Continued)

FOREIGN PATENT DOCUMENTS

EP    0392528 A2    10/1990
EP    2801405 A1    11/2014
WO    00/44466 A2    8/2000

OTHER PUBLICATIONS

Guy, Tech; "The Dangers of Chlorinated Paraffin Additives," Fuel & Friction, (2014) (obtained from fuelandfriction.com Sep. 2017).*

(Continued)

*Primary Examiner* — Lucas A Stelling
(74) *Attorney, Agent, or Firm* — Greenberg Traurig LLP

(57) ABSTRACT

Materials and methods for mitigating the effects of halide species contained in process streams are provided. A halide-containing process stream can be contacted with mitigation materials comprising active metal oxides and a non-acidic high surface area carrier combined with a solid, porous substrate. The halide species in the process stream can be reacted with the mitigation material to produce neutralized halide salts and a process stream that is essentially halide-free. The neutralized salts can be attracted and retained on the solid, porous substrate.

26 Claims, 2 Drawing Sheets

(51) Int. Cl.
*B01J 20/06* (2006.01)
*B01J 20/28* (2006.01)
*B01J 20/30* (2006.01)
*B01J 20/32* (2006.01)
*B01D 15/36* (2006.01)

(52) U.S. Cl.
CPC ..... *B01J 20/28045* (2013.01); *B01J 20/3042* (2013.01); *B01J 20/3236* (2013.01); *B01J 20/3291* (2013.01); *B01D 2251/304* (2013.01); *B01D 2251/306* (2013.01); *B01D 2251/402* (2013.01); *B01D 2251/404* (2013.01)

(58) Field of Classification Search
CPC .. B01D 15/367; B01D 15/38; B01D 15/3857; B01D 35/00; B01D 35/005; B01D 2251/30; B01D 2251/302; B01D 2251/304; B01D 2251/306; B01D 2251/402; B01D 2251/404; B01D 2251/406; B01D 2251/408; B01J 20/048; B01J 20/06; B01J 20/28045; B01J 20/3042; B01J 20/3236; B01J 20/3291
See application file for complete search history.

(56) References Cited

U.S. PATENT DOCUMENTS

| | | | |
|---|---|---|---|
| 6,200,544 B1* | 3/2001 | Blachman | B01D 53/685 210/660 |
| 2003/0159994 A1 | 8/2003 | Blachman et al. | |
| 2003/0196966 A1 | 10/2003 | Hughes | |
| 2008/0179253 A1* | 7/2008 | Clark | B01J 20/28047 210/660 |
| 2009/0194484 A1* | 8/2009 | Lockledge | B01D 37/025 210/665 |

OTHER PUBLICATIONS

Shaffer, Christopher, "XFR Offers Fast, Accurate Analysis of Chlorine in Fuel Oils," Thermofisher, (Feb. 2015) (obtained from thermofisher.com Sep. 2017).*
European Patent Office; PCT International Search Report, Issued in Connection to PCT/US2017/027211; Jun. 23, 2017; 4 pages; Europe.
European Patent Office; PCT Written Opinion of the International Searching Authority, Issued in Connection to PCT/US2017/027211; Jun. 23, 2017; 8 pages; Europe.

* cited by examiner

MATERIALS AND METHODS FOR MITIGATING HALIDE SPECIES IN PROCESS STREAMS

RELATED APPLICATIONS

This application claims the benefit, and priority benefit, of U.S. Provisional Patent Application Ser. No. 62/377,294, filed Aug. 19, 2016, and U.S. Provisional Patent Application Ser. No. 62/378,059, filed Aug. 22, 2016, the disclosures and contents of which are incorporated by reference herein in their entirety.

BACKGROUND

Field of the Invention

The presently disclosed subject matter relates to mitigating the effects of undesired halide species in process streams within industrial process facilities.

Description of the Related Art

Undesired halide species can be found in industrial process streams and can cause corrosion, fouling and poisoning in process facilities and the equipment and media contained therein. Such undesired halide species are, by nature, acidic and include chlorides, bromides, fluorides and iodides. Common undesired halide species in industrial process facility streams are chloride compounds.

Alumina-based molecular sieves have previously been utilized to mitigate the effects of undesired halide species in process streams. The molecular sieves are commercially available from companies such as UOP, Axens and Criterion, and can be used to treat process streams having halide species concentrations up to 15 ppm measured by spectrometer. The molecular sieves typically contain activated alumina which reacts with halide species to form aluminum halide species. While halide species are removed, the resulting aluminum halide species provide sites for reactions to form other undesirable species. Among these undesired species are hydrocarbons known as green oil. Green oil and other undesirable species can cause severe fouling of process equipment and poisoning of media contained therein.

Also available commercially from, for example, Johnson Matthey, are guard materials which are basic in nature. These materials are typically composed of sodium oxide or sodium hydroxide on supports such as alumina and silica. Beds of these materials can neutralize acidic halide species in concentrations up to 5,000 ppm. In doing so, creation of undesired species including green oil and green oil precursors are avoided but neutralized species can cause fouling in process facilities and media.

These commercially available mitigation materials are limited due to their inability to handle acidic halide species at concentrations above about 15 to 5,000 ppm, their formation of undesired species such as green oil, and their lack of capacity to retain neutralized species. Improvements in this field are therefore desired.

SUMMARY

In accordance with the presently disclosed subject matter, various illustrative embodiments are provided of materials and methods for mitigating the effects of halide species contained in process streams.

In certain illustrative embodiments, a method of treating undesired halide species in a process stream is provided. The process stream can be contacted with a medium comprising a reactant and a retainer. The retainer can be a solid, porous substrate retainer. The acidic halide species in the process stream can be reacted with the reactant in the medium to produce a halide species-free process stream and neutralized halide salts. The neutralized halide salts can be attracted and retained, via sorption, on the retainer. The reactant can include one or more active oxides of Group 1 or Group 2 metals. The reactant can include one or more active oxides of Group 1 or Group 2 metals and at least one non-acidic, high surface area carrier. The active oxides of Group 1 and Group 2 metals can include phosphates of one or more of sodium, potassium, magnesium and calcium. The active oxide can include tribasic potassium phosphate. The carrier can include titanium dioxide. The reactant can be mixed or combined with a liquid carrier to form a slurry. The liquid carrier can include water. The slurry can include an amount of a slurry binder. The process stream can contain up to 3 wt % (30,000 ppm) acidic species. The non-acidic, high surface area carrier can have a surface area of up to 300 square meters per gram. The reactant or slurry can be disposed on or impregnated into the surface of the substrate retainer. The physical composition of the substrate can include the reactant or slurry. The reactant or slurry can comprise the entirety of the composition of the substrate. The substrate can be a reticulate, a monolith, a fibrous solid or a particle bonded solid.

In certain illustrative embodiments, a medium for treating halide species in a process stream is provided. The medium can include a reactant and a retainer. The retainer can be a solid, porous substrate retainer. The reactant can include one or more active oxides of Group 1 or Group 2 metals. The reactant can include one or more active oxides of a Group 1 or Group 2 metals and a non-acidic, high surface area carrier. The reactant can be combined with a liquid to form a slurry. The reactant or slurry can be incorporated onto the surface of the substrate retainer. The physical composition of the substrate can include the reactant or the slurry. The active oxides can include phosphates of one or more of sodium, potassium, magnesium and calcium. The active oxide can include tribasic potassium phosphate. The non-acidic, high surface area carrier can include titanium dioxide. The halides can include chlorides, bromides, fluorides and/or iodides.

While certain embodiments of the presently disclosed subject matter will be described in connection with the present illustrative embodiments shown herein, it will be understood that it is not intended to limit the invention to those embodiments. On the contrary, it is intended to cover all alternatives, modifications, and equivalents, as may be included within the spirit and scope of the invention as defined by the claims.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION

Figure 1:
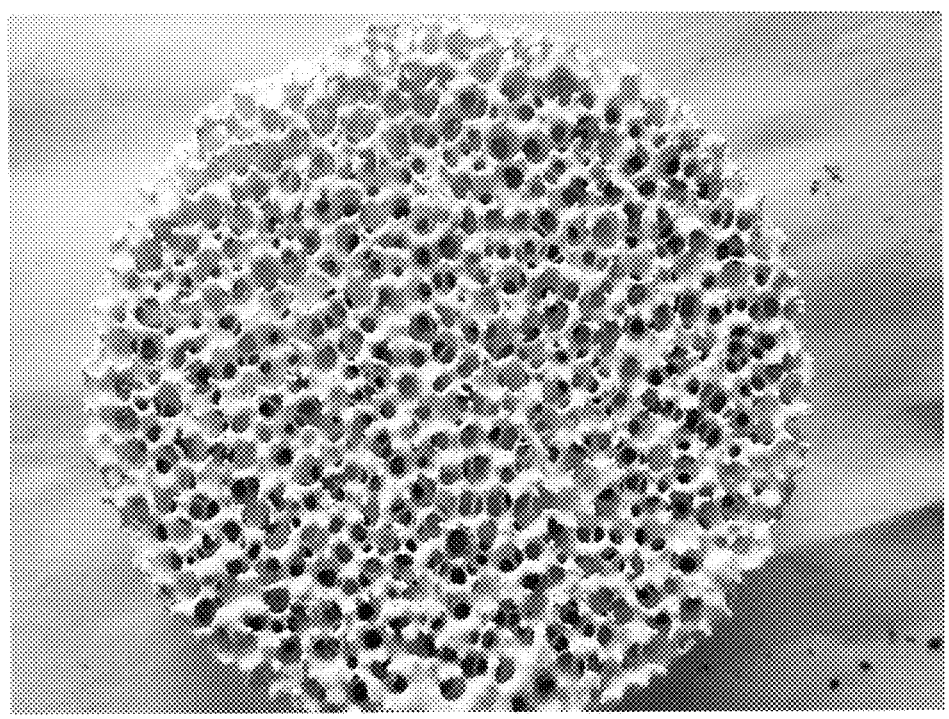
FIG. 1 is an image of a solid, porous substrate material in the form of a reticulated ceramic foam disk according to an embodiment of the present disclosure.

In accordance with the presently disclosed subject matter, various illustrative embodiments of materials and methods are described for improved mitigation of the effects of undesired halide species in process streams within industrial process facilities.

In certain illustrative embodiments, a medium is provided comprising a reactant and a retainer. The reactant can comprise one or more active oxides of Group 1 or Group 2 metals whose functions are to neutralize halide species. The reactant can also comprise one or more non-acidic, high surface area carriers. Carrier non-acidity prevents creation of undesirable species such as green oil. Carrier high surface area facilitates proliferation of reaction sites for the active metal oxides.

In certain illustrative embodiments, the retainer can include a solid, porous substrate whose function is to attract and retain neutralized halide species which otherwise would contribute to fouling of process facilities and media.

In certain illustrative embodiments, the medium is capable of mitigating the effects of halide species in process streams having water content not exceeding 1% and halide species concentrations up to 3% (30,000 ppm) while preventing the formation of undesired species such as green oil and green oil precursors. In certain illustrative embodiments, the presently disclosed subject matter is able to mitigate the effects of halide species in process streams with high concentrations of halide species by converting the halide species to non-reactive, neutralized species (such as salts). Use of this medium does not result in creation of undesired species such as green oil and/or its precursors. The conversion can occur at ambient temperature and pressure (e.g., normal sea level conditions between Earth latitudes 45° South and 45° North) and with little or no temperature increase. The resulting process stream is essentially halide-free and the retainer will have attracted and retained the neutralized halide species.

In certain illustrative embodiments, the active metal oxide components of the reactant include oxides of Group 1 and Group 2 metals including phosphates of sodium, potassium, magnesium and calcium, all of which are basic in nature. Of special interest are tribasic phosphates which are highly basic and have a high capacity to neutralize acidic species.

In certain illustrative embodiments, non-acidic, high surface area carriers can be utilized. Non-acidity avoids creation of undesired species such as green oil and high surface area facilitates proliferation of reaction sites for the active metal oxide(s). The non-acidic, high surface area carriers can include oxides of titanium, aluminum and zirconium. In certain illustrative embodiments, the non-acidic, high surface area materials will have a surface area of up to 70 square meters per gram. In certain illustrative embodiments, the non-acidic, high surface area materials will have a surface area of up to 150 square meters per gram. In certain illustrative embodiments, the non-acidic, high surface area materials will have a surface area of up to 300 square meters per gram.

In certain illustrative embodiments, a reactant comprising a mixture of the one or more active metal oxides and the one or more non-acidic, high surface area carriers can be formed with the content of the active metal oxide(s) being from about 10 to about 50%.

In certain illustrative embodiments, a slurry can be prepared. The slurry can comprise the reactant, a liquid and an amount of slurry binder. The liquid should be inert and should facilitate formation of a uniform slurry. Water is a preferred liquid. Any medium including slurry as a component will require drying at an appropriate temperature for an appropriate period of time, in certain illustrative embodiments.

In certain illustrative embodiments, the retainer can include porous ceramics or metals (including reticulated materials such as foams), honeycomb monoliths, fibrous meshes or solids, particle-bonded solids and any carrier with sufficient capability to attract and retain large quantities of neutralized halide species and to tolerate the process conditions to which they are exposed.

In certain illustrative embodiments, the medium can comprise a solid, porous substrate retainer composed in its entirety by the reactant or the slurry. The medium can be composed of the solid, porous substrate combined in part with the reactant or the slurry. The medium can also be composed of the solid, porous substrate coated or impregnated with the reactant or the slurry. The retainer can be composed entirely by the reactant or by the slurry. The presently described subject matter may be utilized in a variety of process industries including continuous and/or batch processes. For example, and without limitation, the process industry can comprise one or more of refining, processing and manufacturing of: petroleum products, biofuels and biolubricants, petrochemicals, chemicals and natural gas and its components.

In certain illustrative embodiments, the process streams can be liquid or vapor, combinations of the two or mixtures of the two. The process streams can be entering, exiting and/or within vessels, piping and other ancillary equipment comprising industrial process facilities.

In certain illustrative embodiments, a method of mitigating halide species contained in a process stream is provided. The process stream can be contacted with a medium which includes a reactant combined with a retainer.

In certain illustrative embodiments, the reactant can include one or more active metal oxides mixed with one or more non-acidic, high surface area carriers. In certain illustrative embodiments, the mixture can be combined with a solid porous substrate retainer. The acidic halide species can be essentially eliminated by reaction with the reactant to produce an essentially halide-free process stream and neutralized halide species, typically salts. The neutralized halide species can be attracted to and retained on the solid, porous substrate retainer.

In certain illustrative embodiments, a method of treating halide species in a process stream and mitigating the undesired effects of the halide species is provided. The halide species in the process stream can be contacted with a medium to produce both retained neutralized halide salts and a process stream that is essentially halide-free.

In certain aspects, the halide species-containing process stream contains very little free water. Free water contents in excess of about 1% will deactivate the active components of the reactant, in certain illustrative embodiments. The halide species-containing process stream can contain up to 3 wt % halide species.

The reactant can include one or more active metal oxides combined with one or more non-acidic, high surface area carriers. The active metal oxides can include oxides of Group 1 or Group 2 metals. An example of an active metal oxide can be tribasic potassium phosphate. An example of a non-acidic, high surface area carrier can be titanium dioxide.

The reactant can be mixed with a liquid to form a slurry. The liquid can be water. The slurry can further comprise an amount of a slurry binder.

In certain illustrative embodiments, the reactant or slurry can be coated on or impregnated in the surfaces of the solid, porous substrate retainer. The reactant or r slurry can also be included in the formation of the solid, porous substrate retainer. The solid, porous substrate retainer can be composed entirely by the reactant or the slurry.

Neutralization of halide species by contacting the halide species-containing process stream with the medium can occur at near ambient conditions and with no or little noticeable exotherm. Attraction and retention of neutralized halides species can be on the surfaces of the solid, porous substrate retainer. Operation of the method does not lead to formation of undesired species such as green oil or its precursors.

In certain illustrative embodiments, a medium for mitigating halide species in a process steam is provided. The medium can be a solid, porous substrate retainer with a reactant or slurry disposed thereon or therewith.

To facilitate a better understanding of the presently disclosed subject matter, the following example of a particular embodiment is given. In no way should the following example be read to limit, or define, the scope of the presently disclosed subject matter.

Example #1

A test medium was prepared according to the following procedure. A mixture of 50% tribasic potassium phosphate and 50% titanium dioxide was combined with an equal volume of water to form a slurry. Actigel slurry binder was added. Solid, porous substrate materials in the form of reticulated ceramic foam disks 2 inches in diameter by 0.5 inches high (See FIG. 1) were immersed in the slurry. The slurry-coated disks were dried at 300° C. for 30 minutes.

Figure 2:
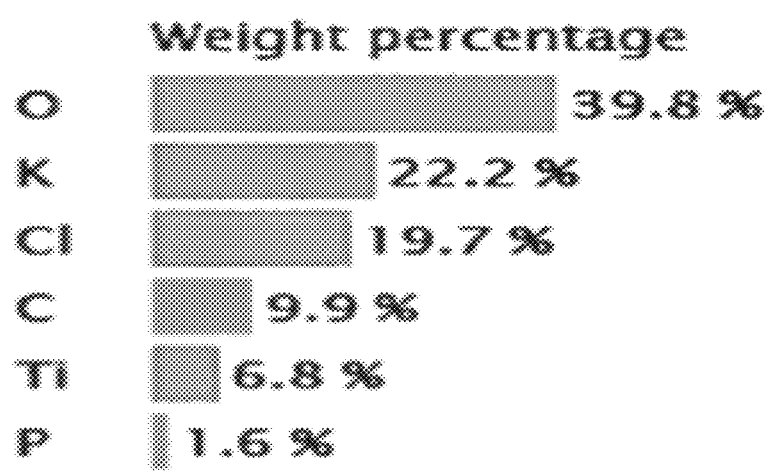
FIG. 2 is a graph showing a molecular analysis of experimental test results according to an embodiment of the present disclosure.

Three hydrocarbon test liquids were prepared each containing about 1% of a different acidic chloride species, namely: hydrochloric acid, benzoyl chloride and carbon tetrachloride, respectively. The test medium (that is, the dried slurry-coated disks) was immersed in the three test liquids. Test conditions were ambient temperature and pressure. Neutralization of the chloride species to form potassium chloride salt was essentially instantaneous with no noticeable increase in the temperature of the reaction mixture. Laboratory analysis showed the treated test liquids to be chlorine-free. When the salts filtered into the reticulated disks, the coloration of the disks changed from near-white to yellowish. Tapping the slurry-coated disks on the laboratory table released a fine, white powdery substance. Upon analysis, the powder included inert potassium chloride salt, unreacted titanium dioxide, elemental phosphorous and hydrocarbon, as indicated in FIG. 2.

These experimental results demonstrate that desired improvements to the existing art have been achieved, namely: [i] halide species in significant concentrations can be converted to inert salts utilizing a novel medium; [ii] the conversion can be carried out at ambient conditions and with no noticeable reaction exotherm; [iii] solid, porous substrates provide large capability to attract and retain neutralized halide species; [iv] a product is produced that is essentially halide-free; and [v] mitigation of halide species can be achieved without the formation of undesired species such as green oil or its precursors.

While the disclosed subject matter has been described in detail in connection with a number of embodiments, it is not limited to such disclosed embodiments. Rather, the disclosed subject matter can be modified to incorporate any number of variations, alterations, substitutions or equivalent arrangements not heretofore described, but which are commensurate with the scope of the disclosed subject matter. Additionally, while various embodiments of the disclosed subject matter have been described, it is to be understood that aspects of the disclosed subject matter may include only some of the described embodiments. Accordingly, the disclosed subject matter is not to be seen as limited by the foregoing description, but is only limited by the scope of the claims.

What is claimed is:

1. A method of treating chloride species in a process stream, the method comprising:
    contacting the process stream with a medium comprising a reactant and a substrate retainer, wherein the process stream comprises a hydrocarbon fluid, the reactant comprises both a Group 1 and a Group 2 metal phosphate and at least one non-acidic carrier, and the substrate retainer comprises a solid, porous material, and wherein the process stream is associated with a continuous or batch process in an industrial process facility;
    reacting the chloride species in the process stream with the medium to produce an essentially chloride-free process stream and neutralized chloride salts; and
    attracting and retaining the neutralized chloride salts on the substrate retainer.

2. The method of claim 1, wherein the Group 2 metal phosphate comprises calcium phosphate.

3. The method of claim 2, wherein the Group 2 metal phosphate comprises tribasic calcium phosphate.

4. The method of claim 1, wherein the Group 1 metal phosphate comprises potassium phosphate.

5. The method of claim 4, wherein the Group 1 metal phosphate comprises tribasic potassium phosphate.

6. The method of claim 1, wherein the non-acidic carrier comprises titanium dioxide.

7. The method of claim 1, wherein the reactant is combined with a liquid to form a slurry.

8. The method of claim 7, wherein the liquid comprises water.

9. The method of claim 7, wherein the slurry comprises an amount of a slurry binder.

10. The method of claim 1, wherein the process stream contains up to 3 wt % chloride species.

11. The method of claim 1, wherein the reactant is disposed on or impregnated into the surface of the substrate retainer.

12. The method of claim 1, wherein the physical composition of the substrate retainer includes the reactant.

13. The method of claim 1, wherein the non-acidic carrier comprises an oxide of aluminum.

14. The method of claim 1, wherein the non-acidic carrier comprises zirconium dioxide.

15. The method of claim 1, wherein the industrial process facility performs one or more of refining, processing and manufacturing of petroleum products, biofuels and biolubricants, petrochemicals, chemicals or natural gas and its components.

16. The method of claim 1, wherein the solid porous material is a reticulated ceramic material.

17. The method of claim 1, wherein the reaction occurs at ambient temperature and pressure and does not result in a temperature increase.

18. The method of claim 1, wherein the medium is capable of mitigating the effects of chloride species in process streams having water content not exceeding 1% and chloride species concentrations up to 3%. exceeding 1% and chloride species concentrations up to 3%.

19. A method of treating chloride species in a process stream, the method comprising:
contacting the process stream with a medium comprising a reactant and a solid porous substrate retainer, wherein the process stream comprises a non-aqueous fluid, the reactant comprises both a Group 1 and a Group 2 metal phosphate and at least one non-acidic carrier, and the substrate retainer comprises a solid, porous reticulated ceramic material having a surface area of up to 300 square meters per gram, and wherein the process stream is associated with a continuous or batch process in an industrial process facility;
reacting the chloride species in the process stream with the medium to produce a chloride-free process stream and neutralized chloride salts; and
attracting and retaining the neutralized chloride salts on the solid, porous substrate retainer.

20. The method of claim 15, wherein the Group 2 metal phosphate comprises magnesium phosphate.

21. The method of claim 20, wherein the Group 2 metal phosphate comprises tribasic magnesium phosphate.

22. The method of claim 15, wherein the Group 2 metal phosphate comprises calcium phosphate.

23. The method of claim 22, wherein the Group 2 metal phosphate comprises tribasic calcium phosphate.

24. The method of claim 15, wherein the industrial process facility performs one or more of refining, processing and manufacturing of petroleum products, biofuels and biolubricants, petrochemicals, chemicals or natural gas and its components.

25. The method of claim 19, wherein the reaction occurs at ambient temperature and pressure and does not result in a temperature increase.

26. The method of claim 19, wherein the medium is capable of mitigating the effects of chloride species in process streams having water content not exceeding 1% and chloride species concentrations up to 3%.

* * * * *